Patented Sept. 7, 1943

2,328,759

UNITED STATES PATENT OFFICE 2,328,759

REMOVING ODOR OF NIGROSINES AND INDULINES

Ottmar Wahl, Leverkusen I. G.-Werk, Germany, assignor to General Aniline & Film Corporation, a corporation of Delaware No Drawing. Application June 13, 1938, Serial No. 213,419. In Germany, June 19, 1937

3 Claims. (Cl. 260—267)

The present invention relates to a process for removing the odor of nigrosines and indulines and to the products obtained by this process.

It is known that the nigrosines and indulines have a disagreeable odor. This odor is caused by minor parts of basic components which are contained therein or formed after some time. Therefore it is almost impossible to use such dyestuffs for dyeing victuals.

It has been attempted to cover their disagreeable smell by adding other odor-substances to the nigrosines and indulines. Only a temporary success can however thus be achieved for, on the one hand, the odor-substances which can only be added in a small quantity, evaporate, and on the other hand, the said basic components causing the specific smell of the nigrosines and indulines increase.

According to the present invention the said odor of the nigrosines and indulines is permanently removed by the addition of carboxylic acids or derivatives or substitution products thereof.

Suitable carboxylic acids and derivatives and substitution products thereof are for instance citric acid, tartaric acid, saccharic acid, cinnamic acid, benzoic acids (and their substitution products, such as hydroxy-, amino-, sulfo-benzoic acids and others), uric acid, urea and others.

The quantity of the mentioned substances to be added may vary between wide limits, but in most cases additions of 2–5% by weight (calculated on the dyestuff) are sufficient.

Preferably the process is carried out so that in case of the water-soluble dyestuffs the additions are added in the last phase of the production to the aqueous solution which is to be steamed down, after the sulfonation and neutralization is complete. In case of spirit-soluble dyestuffs, these are preferably dissolved in a suitable solvent which, after making the additions and mixing well, is again evaporated.

The following examples illustrate the invention, the parts being by weight:

Example 1

To an aqueous solution which is obtained after sulfonation and neutralization of 100 parts of nigrosine, spirit-soluble (Schultz, Farbstofftabellen, VII. Auflage, No. 985) and which is to be steamed down, 3.5 parts of tartaric acid are added; this mixture is slowly evaporated to dryness while stirring. Thereby a nigrosine is obtained of the same quality as the nigrosine WL (Schultz, Farbstofftabellen, VII. Auflage, No. 986) which is completely odorless in the cold, and which does not show any basic by-odors when boiled up with water.

Instead of tartaric acid also citric acid, salicylic acid, p-oxybenzoic acid, aminosulfosalicylic acid, uric acid, urea and others can be used.

Example 2

In the same manner as described in Example 1, an odorless induline of the property of the induline, greenish (Schultz, Farbstofftabellen, VII. Auflage, No. 984) is obtained by adding 4 parts of cinnamic acid to an aqueous neutralized sulfonation liquor of 100 parts of induline base B bluish (Schultz, Farbstofftabellen, VII. Auflage, No. 982) and evaporating the mixture to dryness.

Example 3

100 parts of nigrosine, spirit-soluble (Schultz, Farbstofftabellen, VII. Auflage No. 985) are dissolved in 1000 parts of alcohol by heating with stirring. Then 5 parts of citric acid are added to this solution and the alcohol is distilled off. A nigrosine remains of the known properties which after redissolution in solvents or even when boiled up with water does not show any disagreeable odor.

Instead of alcohol also other solvents are suited for dissolving the components, such for instance as acetone, acetic ester and so on.

Example 4

In the same manner as described in Example 3 an odorless dyestuff is obtained by adding 8 parts of benzoic acid to 100 parts of induline, spirit-soluble, (Schultz, Farbstofftabellen, VII. Auflage, No. 982).

Example 5

In the same manner as described in the foregoing examples also odorless mixtures of nigrosines and indulines can be obtained. Thus, to an aqueous solution containing 50 parts of nigrosine WL (Schultz, Farbstofftabellen, VII. Auflage No. 986) and 40 parts of induline, greenish (Schultz, Farbstofftabellen, VII. Auflage, No. 984) 4.5 parts of tartaric acid are added and the mixture is evaporated to dryness.

I claim:

1. Process for removing the odor of per se malodorous nigrosines and indulines which comprises adding thereto water-soluble substances selected from the group consisting of carboxylic acids, carboxylic acid amides, carboxylic acid esters and their sulfo amino and hydroxy substitution products in a quantity not substantially greater than that required to deodorize said nigrosines and indulines and amounting to from about 2 to about 8% by weight of said nigrosines and indulines.

2. Process for removing the odor of per se malodorous nigrosines and indulines which comprises adding to solutions of these dyestuffs water-soluble substances selected from the group consisting of carboxylic acids, carboxylic acid amides, carboxylic acid esters and their sulfo amino and hydroxy substitution products in a quantity not substantially greater than that required to deodorize said nigrosines and indulines and amounting to from about 2 to about 8% by weight of said nigrosines and indulines and evaporating the solution.

3. Process for removing the odor of per se malodorous nigrosines and indulines which comprises adding thereto a quantity of water-soluble carboxylic acid not substantially greater than that required to deodorize said nigrosines and indulines and amounting to from about 2 to about 8% by weight of said nigrosines and indulines.

OTTMAR WAHL.